United States Patent
Boos

(10) Patent No.: US 7,792,504 B2
(45) Date of Patent: *Sep. 7, 2010

(54) TRANSMITTER AND TRANSCEIVER, IN PARTICULAR FOR MOBILE RADIO, AND TRANSMISSION METHOD

(75) Inventor: Zdravko Boos, München (DE)

(73) Assignee: Infineon Technologies AG, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/488,876

(22) Filed: Jun. 22, 2009

(65) Prior Publication Data

US 2009/0258605 A1    Oct. 15, 2009

Related U.S. Application Data

(60) Division of application No. 11/493,239, filed on Jul. 26, 2006, now Pat. No. 7,634,245, which is a division of application No. 10/337,050, filed on Jan. 6, 2003, now Pat. No. 7,103,343, which is a continuation of application No. PCT/EP01/07466, filed on Jun. 29, 2001.

(30) Foreign Application Priority Data

Jul. 5, 2000    (EP)    .................. 00114445

(51) Int. Cl.
*H04B 1/04*    (2006.01)
*H01Q 11/12*    (2006.01)
*H04B 1/40*    (2006.01)

(52) U.S. Cl. ........................ 455/118; 455/76
(58) Field of Classification Search .................... 455/75, 455/76, 118; 341/144
See application file for complete search history.

(56) References Cited

U.S. PATENT DOCUMENTS

| 4,916,640 | A | 4/1990 | Gasperi et al. |
|---|---|---|---|
| 5,267,260 | A | 11/1993 | Lee |
| 5,271,039 | A | 12/1993 | Suzuki |
| 5,430,890 | A | 7/1995 | Vogt et al. |
| 5,535,432 | A | 7/1996 | Dent |
| 5,663,734 | A | 9/1997 | Krasner |
| 5,783,974 | A | 7/1998 | Koslov et al. |
| 6,021,110 | A | 2/2000 | McGibney |
| 6,061,704 | A | 5/2000 | Östman et al. |
| 6,088,406 | A | 7/2000 | Suzuki |
| 6,307,896 | B1 | 10/2001 | Gumm et al. |
| 6,424,826 | B1 | 7/2002 | Horton et al. |
| 7,103,343 | B2 * | 9/2006 | Boos .......................... 455/316 |
| 2001/0055957 | A1 | 12/2001 | Doetsch et al. |
| 2002/0047793 | A1 * | 4/2002 | Eriksson et al. ............. 341/144 |
| 2003/0048500 | A1 | 3/2003 | Fala et al. |
| 2003/0176173 | A1 | 9/2003 | Klemmer |
| 2003/0194978 | A1 | 10/2003 | Vorenkamp et al. |
| 2006/0030277 | A1 | 2/2006 | Cyr et al. |

FOREIGN PATENT DOCUMENTS

EP    757446 A2    2/1997

(Continued)

*Primary Examiner*—Nguyen Vo
(74) *Attorney, Agent, or Firm*—Laurence A. Greenberg; Werner H. Stemer; Ralph E. Locher

(57) ABSTRACT

A receiver, in particular for mobile radio, includes a receiver branch with a mixer, downstream of an analog/digital converter. A reference generator generates a reference clock, which is fed to the converters or PLL synthesizers of the mixer by integral multiplication or division. As a result, a particularly energy-saving and space-saving circuit configuration is realized, which has a low level of mutual interference between the signals and is suitable (in particular for Universal Mobile Telecommunication System, UMTS). In a preferred embodiment, the receiver is developed into a transceiver by providing a transmission path.

7 Claims, 3 Drawing Sheets

FOREIGN PATENT DOCUMENTS

| | | | |
|---|---|---|---|
| EP | 0825742 | A2 | 2/1998 |
| GB | 2304243 | A | 12/1997 |
| JP | 1065605 | A | 3/1989 |
| JP | 4065912 | A | 3/1992 |
| JP | 9191253 | A | 7/1997 |
| JP | 10257112 | A | 9/1998 |
| JP | 11513787 | T | 11/1999 |
| WO | 9926336 | A1 | 5/1999 |
| WO | 0025419 | A1 | 5/2000 |

* cited by examiner

TRANSMITTER AND TRANSCEIVER, IN PARTICULAR FOR MOBILE RADIO, AND TRANSMISSION METHOD

CROSS-REFERENCE TO RELATED APPLICATIONS

This is a division of copending application Ser. No. 11/493,239, filed on Jul. 26, 2006; which was a division of application Ser. No. 10/337,050, filed Jan. 6, 2003; which was a continuation, under 35 U.S.C. §120, of International application PCT/EP01/07466, filed Jun. 29, 2001; the application also claims the priority, under 35 U.S.C. §119, of European patent application 00 114 445.0, filed Jul. 5, 2000; the prior applications are herewith incorporated by reference in their entirety.

BACKGROUND OF THE INVENTION

Field of the Invention

The invention relates to a high-frequency receiver, in particular for mobile radio, a transmitter, a transceiver, and a method of transmitting signals.

The mobile radio standard GSM (Global System for Mobile Communication) is widespread in Germany and Europe and other countries. The existing GSM networks have large area coverage.

A new standard for transmitting relatively large amounts of data by mobile radio is known as "Universal Mobile Telecommunication System" (UMTS) in Europe, and as "International Mobile Telecommunication System 2000" (IMT-2000) internationally. While mobile radio devices for the GSM standard are also referred to as second-generation devices, the mobile radio devices for the UMTS or IMT-2000 standard are known as "third generation mobile radio devices".

In order to permit a smooth changeover from the GSM standard to the UMTS standard, it is appropriate for the new third generation devices to be compatible (also) with the GSM standard until large-area network coverage with UMTS is ensured.

Important development objectives when configuring circuitry for mobile radio receivers are a high-integration density (in order to ensure a small area requirement), low power drain (in order to ensure long operation independently of the network), downward compatibility with previous standards and avoidance or suppression of undesired signals (for example, as a result of crosstalk).

It is conventional to derive each desired clock rate from a reference clock by using PLL synthesizers, which are costly to implement and operate with fractional relationships.

SUMMARY OF THE INVENTION

It is accordingly an object of the invention to provide a receiver, in particular for mobile radio, that overcomes the hereinafore-mentioned disadvantages of the heretofore-known devices of this general type, and that is suitable for the described third generation devices (in which the avoidance or suppression of undesired signals is improved).

With the foregoing and other objects in view, there is provided, in accordance with the invention, a receiver, in particular for mobile radio, having: a (first) mixer to which a reception signal can be fed (at the input end) and at which a (first) intermediate frequency signal can be tapped (at the output end); a (first) phase locked loop which is connected to the first mixer and to which a first reference clock can be fed; an analog/digital converter which is connected to the output of the first mixer and to which a converter clock can be fed, and a reference generator for generating a second reference clock. The second reference clock is an integral multiple of the first reference clock, and the converter clock is an integral multiple of the second reference clock.

The invention is based on the principle of specifying a clock distribution concept, in which the analog/digital converters and the mixers are supplied by a reference clock, making it possible to form the respectively required converter clock or reference clock by multiplication or division (by integers).

Therefore, a manner of deriving the reference frequency for the PLL stages or phase locked loops is specified, which is easy to implement and avoids the use of frequency synthesizers which operate with fractions.

The simple manner of deriving converter clocks and reference clocks for the PLL stages of mixers (which is possible by integral multiplication or division) permits the implementation of a receiver, which has a low-power requirement, a small chip area and is cost-effective.

Driving an A/D or D/A converter by integral derivation of the converter clock from a quartz-stabilized reference clock provides the advantage of low-jitter during the A/D or D/A conversion.

In accordance with another feature of the invention, there are provided a second mixer to which another intermediate frequency signal can be fed (at the input end) and at which a transmission signal can be tapped (at the output end). Further, a second phase locked loop is connected to the second mixer, and another reference clock can be fed to it. A digital/analog converter (to which another converter clock can be fed) is connected to the input of the second mixer. The second reference clock is an integral multiple of the other reference clock, and the other converter clock is an integral multiple of the second reference clock.

Driving converters and PLL stages of mixers in a transmit branch with a clock, which is in each case also obtained from the reference clock (by multiplication or division by an integer), makes it possible to implement a particularly energy-saving and area-saving circuit configuration of a receiver with a transmitter section.

In accordance with a further feature of the invention, the first reference clock is substantially equal to the other reference clock, and the converter clock is substantially equal to the other converter clock. As a result, a particularly simple circuit configuration, with low power requirement and a reduction of mutual interference (between the transmit branch and receive branch), can be realized.

In accordance with an added feature of the invention, there are provided a first digital mixer connected downstream of the analog/digital converter, and a first interpolator connected downstream of the first digital mixer. Further, a second digital mixer is connected upstream of the digital/analog converter, and a second interpolator is connected upstream of the second digital mixer.

The digital mixers are mainly used for "automatic frequency control". The analog/digital converter, which may be embodied, for example, as a ΣΔ converter and which can have low-pass properties, results in a reduction in the clock. The first interpolator is provided in order to convert the converter clock, which is reduced by the analog/digital converter and derived from the reference clock into a desired clock for further digital processing of the data. The first interpolator may be composed of several sub-interpolators, which are (each) of simple configuration.

The desired clock rate may be, for example, the bit rate of a spread signal (referred to as the "chip rate"), which is higher (by the spread factor) than the bit rate of the data sequence. As a result, a code division multiple access (CDMA) can easily be supported.

In the receiver transmit branch (having the second mixer and the digital/analog converter), a spread signal (which can be fed to the second interpolator) is interpolated with respect to its clock in such a way that a clock rate, which is interpolated in the digital/analog converter using the converter's predefined interpolation factor, is available at the input of the digital/analog converter.

In accordance with an additional feature of the invention, the analog/digital converter has a first digital filter, and the digital/analog converter has a second digital filter. Digital filters (as are customary, for example, in ΣΔ converters) reduce the converter clock, for example by the factor 8 or other base 2 powers.

In accordance with yet another feature of the invention, the first and second interpolators each have several sub-interpolators, which are configured in series. The conversion of the clock, downstream of the first digital mixer, or upstream of the second digital mixer, to the respectively desired bit rate of the spread signal can be implemented with little expenditure and good transmission properties of the useful signal (in that, in each case, a clock ratio which is a fraction of small numbers, for example 4, 5, 1, 3, 8, 13, is implemented).

The modular principle (with several sub-interpolators configured in series) also has the advantage that adaptation to the respectively required bit rate of the spread signal is possible with very little expenditure (for example, adaptation for the Chinese TD SCDMA system with an additional division by 3).

In accordance with yet a further feature of the invention, the reference clock has a clock frequency of substantially 13 MHz. This is particularly advantageous since the same reference clock, which was usually used for second generation mobile radio devices, can be used with the present circuitry principle for third generation mobile radio devices. This gives rise to particularly low requirements of the circuit in terms of area and power. In addition, a simple way of integrating a transceiver device, which can support both the GSM standard and the UMTS standard, is thus realized.

In accordance with a concomitant feature of the invention, the clock frequency of the reference clock is substantially 40 MHz. This has the advantage that, when the transmit path is embodied as a super-heterodyne transmitter with an intermediate frequency of 190 MHz, the harmonics of the reference clock do not occur in the intermediate frequency band.

Other features which are considered as characteristic for the invention are set forth in the appended claims.

Although the invention is illustrated and described herein as embodied in a receiver, in particular for mobile radio, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
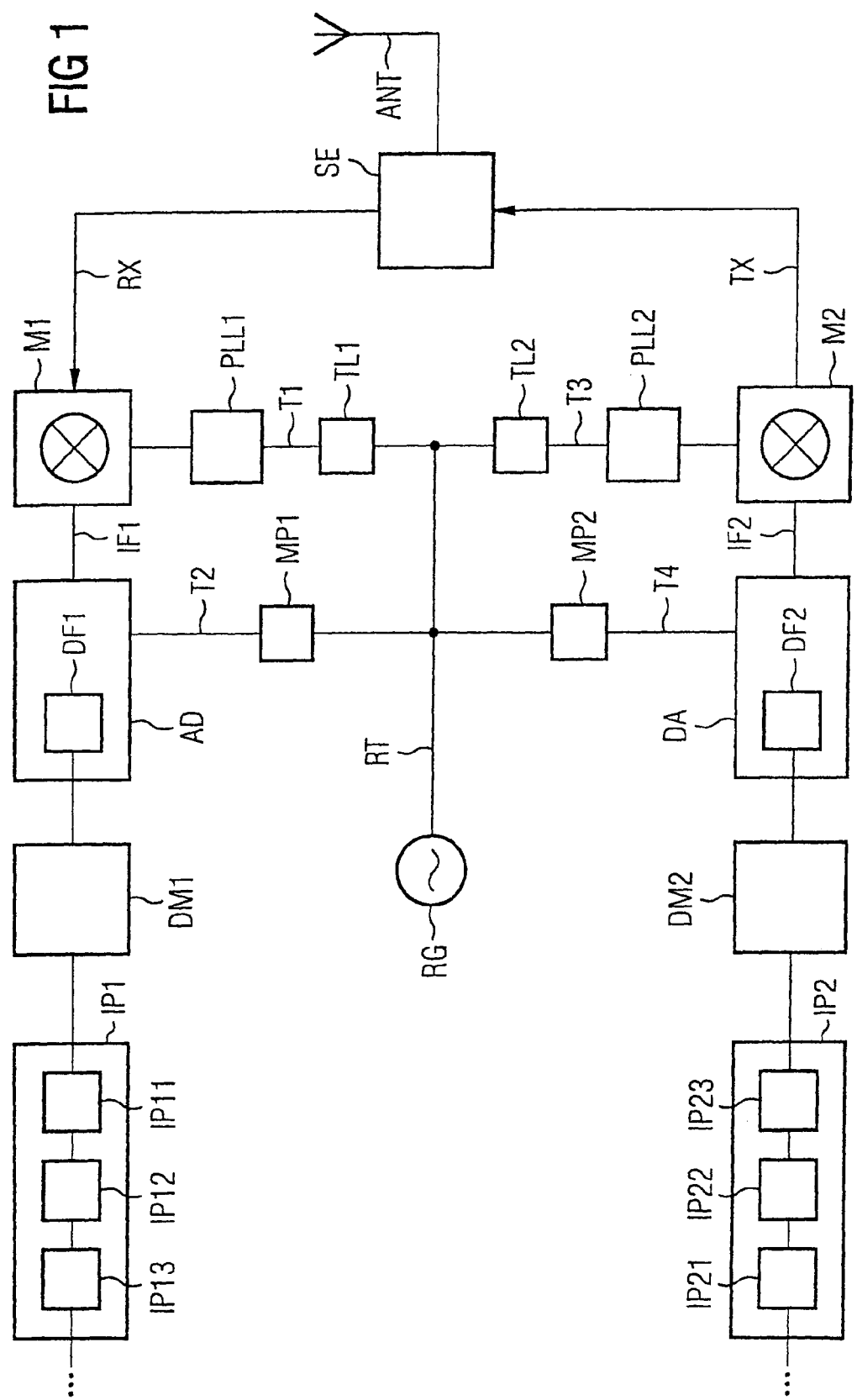
FIG. 1 is a basic schematic and block diagram of a circuit configuration of a receiver according to the invention.

Referring now to the figures of the drawings in detail and first, particularly to FIG. 1 thereof, there is shown a receiver with a "transmit section". A "receive path" and a "transmit path" are connected to an antenna ANT using a transmit/receive switchover device SE. The upper branch of FIG. 1 shows the receive path, while the lower branch represents the transmit branch. A reception signal RX is fed (at the input end) to a first mixer M1 with which it is down-mixed to an intermediate frequency level with an intermediate frequency IF1 using an additional, locally generated oscillator frequency.

The intermediate frequency signal IF1 is then fed to an analog/digital converter AD, which has a first digital filter DF1. Both of the first mixer M1 and the analog/digital converter AD require (for their operation) a clock frequency, which is derived from a reference clock RT. For this purpose, a reference generator RG is provided, which generates a reference clock RT or master clock. The first reference clock T1, which is necessary for the reference frequency of the PLL stage PLL1 connected to the first mixer, is derived from a second reference clock RT by division (by an integer). The converter clock frequency T2, which is necessary for the operation of the analog/digital converter AD, is made available by a multiplier module MP1 which multiples the reference clock RT by an integer (which may be 1).

Thus, the converter clock T2 is an integral multiple of the reference clock RT. A first digital mixer DM1, which is used for automatic frequency control (AFC) in the receiver, is also connected downstream of the analog/digital converter AD. Finally, an interpolator module IP1, which has several subinterpolators IP11, IP12, IP13 configured in series, is connected downstream of the first digital mixer DM1. In order to perform further digital processing of the useful signal in the receive branch, it is possible to configure, for example, non-illustrated functional units for speech processing.

The transmit branch of FIG. 1 is of similar configuration to the receive branch, with an interpolator IP2 (with subinterpolators IP21, IP22, IP23, which are configured in series) and a second digital mixer DM2, connected downstream of the second interpolator IP2, for automatic frequency control (AFC).

A digital/analog converter DA (which has a digital filter DF2) and a second mixer M2 (for feeding another intermediate frequency signal IF2 to the input of the second mixer M2) are connected downstream of the second digital mixer DM2. The output of the second mixer M2 can be connected to the antenna ANT via the transmit/receive switchover device SE. Another converter clock T4, which is necessary to operate the digital/analog converter DA, is obtained from the reference clock RT by multiplication (by an integer) in the multiplier stage MP2. The other reference (mixer) clock T3, which is necessary for operating the second PLL stage PLL2 connected to the second mixer M2, is obtained from the (second) reference clock RT by division (by an integer) in the divider stage TL2.

The circuit of FIG. 1 has the advantage that the multiplier/divider stages (for supplying the respective modules with a reference clock) are of simple configuration, since they do not require any fractional relationships to be implemented.

In addition, as a result, the power requirement is low and the required chip surface is small. If the analog/digital converter AD has, for example, a clock reduction ratio of 8, which may be brought about by the digital filter DF1 contained in the analog/digital converter AD, a correspondingly reduced clock rate is fed to the first interpolation stage IP1 (via the first digital mixer DM1).

The interpolation stage IP1 implements the conversion of the reduced clock into the desired bit rate of the spread signal, which is 3.84 MHz (in the case of UMTS) or 1.28 MHz (for China).

The modular configuration of the first and second interpolators IP1, IP2 makes it possible to configure, for example, one of the subinterpolators for a factor 3 (or a third), which can easily be spanned depending on the intended country or specification. Preferred divider ratios of the subinterpolators are, for example, 8/5, 4/5, 3/5, 1/5, 8/13 and 1/3. The entire divider ratio of the first interpolator IP1 is obtained by multiplying the divider ratio of the subinterpolators.

Circuit adaptation can easily be carried out for the US systems CDMA 2000 and IS-95, which can operate with spread signal bit rates (chip rates) of 3.6864 Mcps (mega chip per second) and 1.2288 Mcps, respectively, using subinterpolator divider ratios of 6/5 and 4/5 or 6/5 and 2/5, respectively.

Preferred integral divider ratios of the dividers TL1, TL2 are 8, 40 or 200. In contrast to the representation of FIG. 1, when the multiplier and divider ratios are the same, a divider module or a multiplier module can be respectively omitted so that the space required is particularly small. In addition, undesired mutual influences between signals (on the integrated circuit) can be avoided by connecting the two converters AD, DA (or the two mixers M1, M2) to a common multiplier or divider stage.

Figure 2:
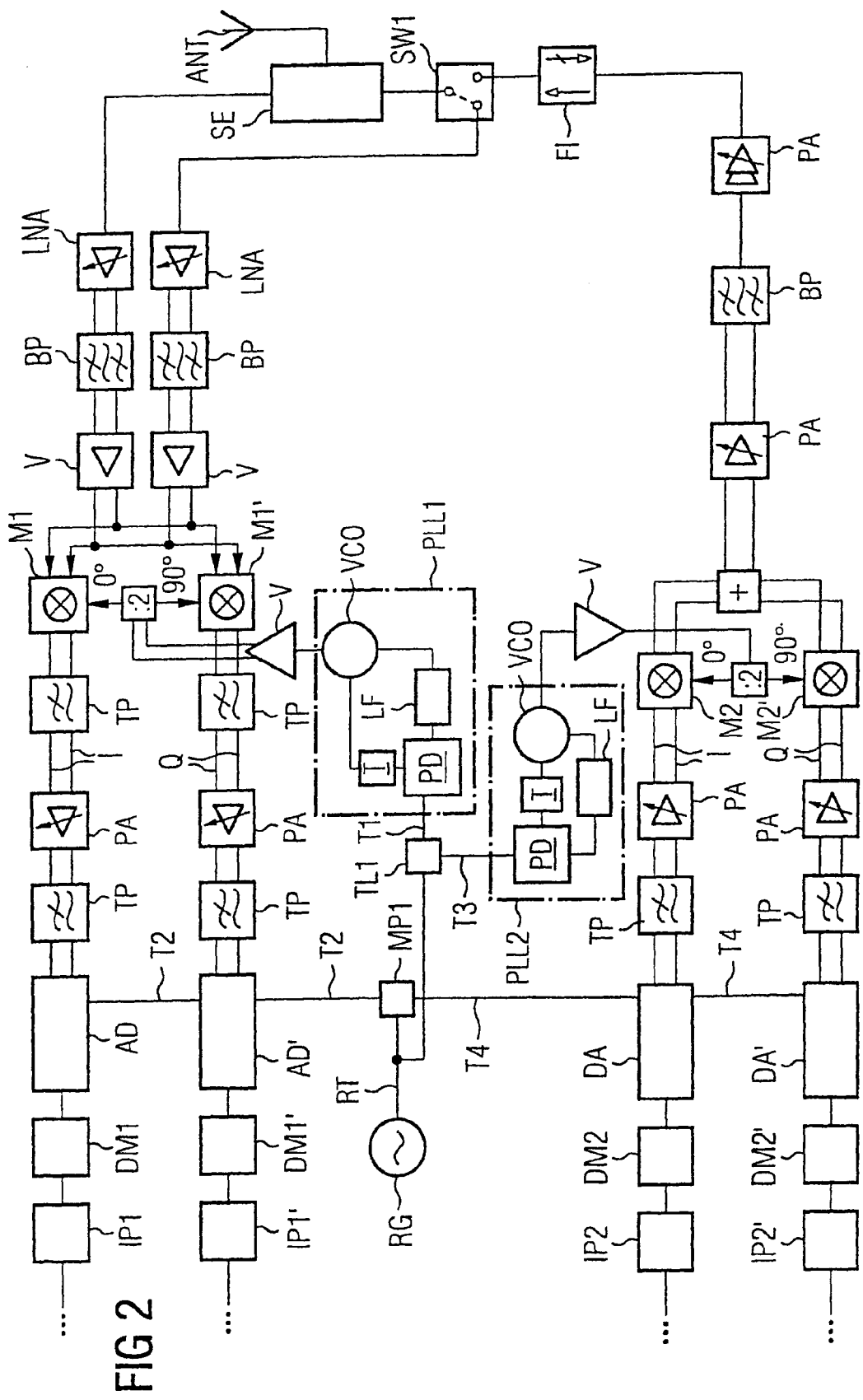
FIG. 2 is a schematic and block diagram of the circuit configuration of the receiver of FIG. 1 according to one embodiment of the invention.

FIG. 2 shows an embodiment of the receiver of FIG. 1. It is to be noted that the "receive section" (illustrated in the top part of the drawing) has two "receive paths", each with a low-noise pre-amplifier LNA, a downstream bandpass filter BP and an amplifier V. This is appropriate with the frequency-duplex and time-duplex methods provided for UMTS, since the respective frequency bands are thus easier to separate and process.

The "upper receive path" which is connected to the transmit/receive filter SE is used for transmission in the frequency division duplex (FDD) mode, and the "lower receive path" is used for reception in the TDD (time division duplex) mode. For this purpose, a switch SW1 is provided for switching-over. Since the receive section of the circuit of FIG. 2 is embodied as a receiver with a 0 MHz intermediate frequency concept (zero IF), and since high data transmission rates are to be expected, the receive section is divided into the quadrature components I, Q. For this purpose, two first mixers M1, M1' are provided, to which a local oscillator signal is fed, once in correct phase and once with a 90° phase shift.

The local oscillator signal is generated in a PLL stage PLL1. The reference frequency required for the first PLL stage PLL1, (i.e., the first mixer clock T1) is derived in a first, integral divider TL1 from the reference clock RT. The phase locked loops PLL1, PLL2 each have a phase detector PD (for comparing the phase angle with the phase angle of the mixer clock T1, T2), a divider T, a voltage-controlled oscillator VCO and a loop filter LF.

Similar to the receive end, the transmit end is also divided into quadrature components I, Q. Controllable amplifiers PA and low-pass filters TP are provided at the "transmit" and "receive" ends in order to condition signals. Due to the quadrature components of the signal I, Q (which are provided in the intermediate frequency level), two second mixers M2, M2' are provided to which a local oscillator signal (which is generated by the second phase locked loop PLL2 and is amplified in an amplifier V) is fed, once in correct phase and once with a 90° phase shift. An adder (with further controllable power amplifiers PA and bandpass filters BP configured downstream), is connected to the outputs of the second mixers M2, M2'. Furthermore, a directional filter F1 is provided for isolating the transmitter and receiver.

The reference generator RG of FIG. 2 has a clock frequency of 13 MHz. The divider TL1 (for dividing down the reference clock RT in integral division) has a divider ratio of 13 or 65, so that (as desired) the first and second mixers M1, M1', M2, M2' have a step size of 1 MHz or 200 kHz. At the receive end, the subinterpolators of the first interpolators IP1, IP1' have division ratios of 8/5, 4/5 and 8/13 so that a bit rate of the spread signal of 3.84 MHz can be generated at the output of the first interpolator. A spread signal bit rate of 1.28 MHz (as is necessary, for example for China) can be generated using a fourth subinterpolator with a divider ratio of 1/3. Of course, the individual subinterpolators can also have other divider ratios. The multiplier MP1 for providing a converter clock has a factor of 3.

As the analog/digital converter AD, AD' carries out (in each case) a clock reduction of $2^3=8$, a reduced clock of 13 MHz·3/8=4.875 MHz is available at its output. The described subinterpolator divider ratios (then) provide a spread signal with a bit rate of 3.84 MHz.

With inverted divider ratios of the subinterpolators of the second interpolator IP2, IP2' of 5/8, 5/4 and 13/8, the bit rate of the spread signal of 3.84 MHz is converted at the transmit end into a clock frequency of 4.875 MHz, which, together with the interpolation factor of 8 (which the digital/analog converters DA, DA' have), and with the converter clock of 3.13 MHz, gives rise to the desired clock rate.

The circuit of FIG. 2 makes it possible to realize a simple receiver, which can be implemented with little requirement for space and has a "transmit section" as the system clock of 13 MHz (which is customary for GSM and which can be generated using customary quartz) can be reused. Thus (with the receiver having the "transmit section" of FIG. 2), it is possible to receive simultaneously in the GSM mode while transmitting in the UMTS mode, or vice versa.

Figure 3:
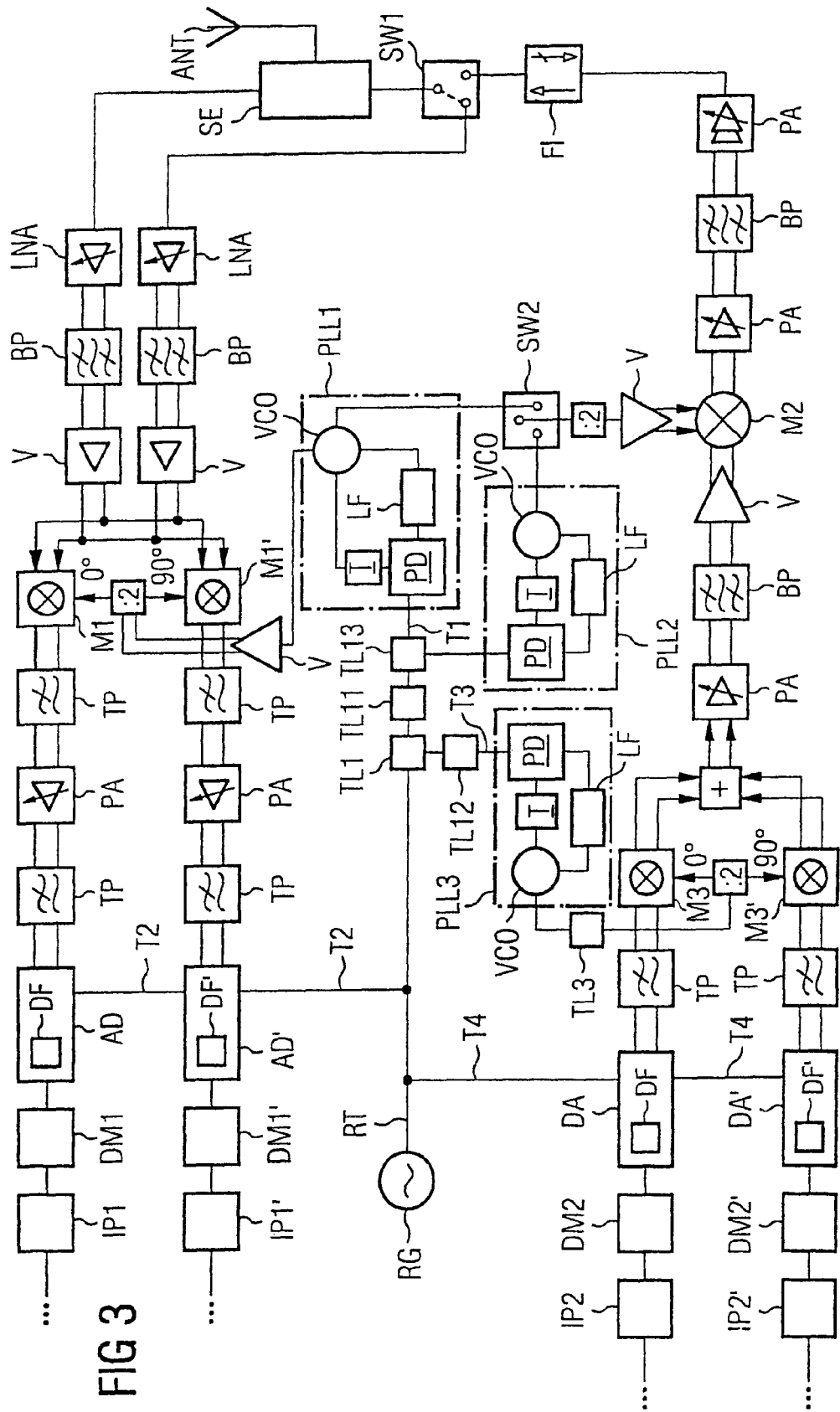
FIG. 3 is a schematic and block diagram of the circuit configuration of FIG. 1, as applied to an UMTS transceiver (according to another embodiment of the invention).

FIG. 3 shows an exemplary embodiment of the receiver of FIG. 1, developed for a UMTS receiver with "transmit section". In contrast to the receiver of FIG. 2, a heterodyne architecture with an intermediate frequency of 190 MHz is implemented in the transmit section of FIG. 3. Since two mixer or frequency converter stages M2, M3, M3' are implemented, a further PLL synthesizer PLL3 is required for the third mixers M3, M3'.

In contrast (to the circuit of FIG. 2), in the circuit of FIG. 3, an integral multiplier is not necessary to derive the converter clock (for the analog/digital converters AD, AD' and the digital/analog converters DA, DA'), since the reference clock is 40 MHz and can be used directly as a converter clock. The integral division factor for deriving the reference clocks for the phase detectors PD of the PLL stages PLL1, PLL2, PLL3 which can be obtained using the dividers TL1, TL11, TL12, TL13 is, in total, 8 or 40 or 200. As a result, step sizes of 5 MHz, 1 MHz or 200 kHz are possible.

Of course, the division factors can also have other integral division relationships depending on the (necessary) step size of the mixers or PLL stages. The analog/digital converters AD, AD' each have a reduction factor of the clock rate of 8. The clock is thus reduced to 5 MHz at its outputs. The reduced clock (by analogy to the embodiment of FIG. 2) is converted in the interpolators IP1, IP1' to the desired bit rate of the spread signal of 3.84 MHz in subinterpolators (which are configured in series and which have division ratios of 8/5, 4/5 and 3/5).

Of course, the division ratios of the subinterpolators can also be appropriately converted. For example, a third subinterpolator with a division ratio of 1/5 may be provided, resulting in a spread signal bit rate of 1.28 MHz (which is required, for example, in China). Division ratios which are reciprocal with respect to this are obtained in the transmit branch. As a result, the subinterpolators have division ratios of 5/8, 5/4 and 5/3 in order to derive the desired clock of 5 MHz from the spread signal clock or spread signal bit rate of 3.84 MHz.

In the digital/analog converters DA, DA', the clock rate is (as is described with respect to FIG. 2) increased to 40 MHz (as in the receive section) by interpolation in the digital filters DF, DF' of the converters DA, DA'. In order to increase the tuning range for the second mixer M2 in the transmit branch of FIG. 3, or in order to keep the tuning range of the PLL stages low, it is possible to use a second switch SW2 for the second mixer M2 to switch between the first PLL stage PLL1 and the second PLL stage PLL2. This architecture is advantageous for the various modes of operation and frequency bands such as FDD (frequency division duplex), TDD (time division duplex) and frequency duplex with variable duplex spacing, which are provided in UMTS.

The described circuit configuration, in particular the described configuration, with the reference clock division (by integral dividers) and the direct feeding of the reference clock to the converter stages, permits a very energy-efficient mode of operation of the circuitry, a small chip space requirement for implementations of the circuit and a low interference level on the integrated circuit. In addition, the converter stages can advantageously operate with a clock reduction or clock interpolation of $2^3$ (or other base 2 powers), which permits the converter circuits to be implemented in an easy way.

Finally, the modular configuration of the first and second interpolators IP1, IP1', IP2 and IP2' permits simple adaptation of the circuit configuration to the different bit rates of the spread signals (in different countries) for code division multiple access CDMA.

The subinterpolators provided in the interpolators of the receiver can operate with the conventional multi-rate processing methods.

The described receivers are configured in such a way that undesired interference signals are largely reduced or do not occur in the high frequency (or intermediate frequency) useful bands.

Since the clock rates are comparatively low, the power drain is low. However, the clock rates are high enough to permit multi-channel reception of the receiver and a favorable reduction factor of 8 in the A/D converters.

The invention claimed is:

1. A transmitter, comprising:
   a mixer having an input for receiving an intermediate signal and an output for tapping a transmission signal;
   a phase locked loop for receiving a mixer clock and connected to said mixer;
   a digital/analog converter connected to said input of said mixer for receiving a converter clock;
   a reference generator for generating a reference clock, the reference clock being an integral multiple of the mixer clock, and the converter clock being an integral multiple of the reference clock; and
   a multiplier module coupled to said reference generator and multiplying the reference clock by an integer to provide the converter clock.

2. The transmitter according to claim 1, further comprising a divider module for dividing the reference clock by an integer to provide the mixer clock, said divider module coupled to said reference generator.

3. The transmitter according to claim 2, wherein said divider module for dividing the reference clock by an integer has an input connected to said reference generator for receiving the reference clock and an output connected to said phase locked loop for providing the mixer clock.

4. The transmitter according to claim 1, wherein said multiplier module for multiplying the reference clock by an integer has an input connected to said reference generator for receiving the reference clock and an output connected to said digital/analog converter for providing the converter clock.

5. A transceiver, comprising:
   a receive path, including:
   a first mixer having an input for receiving a reception signal and an output for tapping a first intermediate frequency signal;
   a first phase locked loop for receiving a first mixer clock and connected to said first mixer;
   an analog/digital converter connected to said output of said first mixer for receiving a first converter clock;
   a transmit path, including:
   a second mixer having an input for receiving a second intermediate signal and an output for tapping a transmission signal;
   a second phase locked loop for receiving a second mixer clock and connected to said second mixer;
   a digital/analog converter connected to said input of said second mixer for receiving a second converter clock;
   a reference generator for generating a reference clock, the reference clock being an integral multiple of the first mixer clock and of the second mixer clock, the first converter clock being an integral multiple of the reference clock, the second converter clock being an integral multiple of the reference clock; and
   a multiplier module for multiplying the reference clock by an integer to provide the first converter clock and the second converter clock.

6. A method for transmitting a transmit signal, which comprises the steps of:
   receiving a mixer clock in a phase locked loop;
   mixing an intermediate frequency signal and providing the transmit signal in response to the mixer clock;
   digital/analog converting an input signal using a converter clock and providing the intermediate frequency signal;
   generating a reference clock, the reference clock being an integral multiple of the mixer clock; and
   providing the converter clock in response to the reference clock using an integer multiplier module.

7. The method according to claim 6, which further comprises providing the mixer clock in response to the reference clock using an integer divider module.

* * * * *